United States Patent
He

(10) Patent No.: US 12,526,768 B2
(45) Date of Patent: Jan. 13, 2026

(54) ENERGY SAVING METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventor: Chuanfeng He, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 373 days.

(21) Appl. No.: 18/120,796

(22) Filed: Mar. 13, 2023

(65) Prior Publication Data

US 2023/0217415 A1 Jul. 6, 2023

Related U.S. Application Data

(63) Continuation of application No. PCT/CN2020/115381, filed on Sep. 15, 2020.

(51) Int. Cl.
*H04W 68/02* (2009.01)
*H04W 52/02* (2009.01)
*H04W 72/23* (2023.01)

(52) U.S. Cl.
CPC ....... *H04W 68/02* (2013.01); *H04W 52/0212* (2013.01); *H04W 72/23* (2023.01)

(58) Field of Classification Search
CPC . H04W 68/02; H04W 52/0212; H04W 72/23; H04W 52/0216; H04W 52/0235;
(Continued)

(56) References Cited

U.S. PATENT DOCUMENTS

2020/0163048 A1* 5/2020 Kim .............. H04W 72/12
2022/0174603 A1* 6/2022 Maleki ........... H04W 52/0216
(Continued)

FOREIGN PATENT DOCUMENTS

CN 1784076 A 6/2006
CN 107770850 A 3/2018
(Continued)

OTHER PUBLICATIONS

Discussion on paging enhancement; 3GPP TSG RAN WG1; R1-2006221, Aug. 17-28, 2020 (Year: 2020).*
(Continued)

*Primary Examiner* — Hirdepal Singh
(74) *Attorney, Agent, or Firm* — BAYES PLLC

(57) ABSTRACT

An energy saving method, a terminal device, and a network device, capable of implementing energy saving of a terminal device in an RRC disconnected state, the method comprising: a terminal device receives first information, the first information comprising paging energy saving configuration information corresponding respectively to each terminal device group amongst a plurality of terminal device groups, each terminal device group comprising at least one terminal device, and the paging energy saving configuration information corresponding to each terminal device group being used for determining whether the at least one terminal device in the terminal device group receives a paging message; and the terminal device performs paging message reception on the basis of the paging energy-saving configuration information corresponding to the terminal device group to which the terminal device belongs.

14 Claims, 5 Drawing Sheets

Paging energy-saving indication information indicates to receive paging message

PO or PF

Paging energy-saving indication information indicates not to receive paging message PO or PF Paging energy-saving indication information indicates to receive paging message PO or PF

(58) Field of Classification Search
CPC ........... H04W 68/025; H04W 52/0229; H04W 76/27; H04W 76/28; H04L 5/0037; H04L 5/0053; Y02D 30/70
USPC .......................................................... 455/458
See application file for complete search history.

(56) References Cited

U.S. PATENT DOCUMENTS

| | | | |
|---|---|---|---|
| 2022/0353844 A1* | 11/2022 | Wang | H04W 76/28 |
| 2023/0292326 A1* | 9/2023 | Jung | H04L 5/0053 |

FOREIGN PATENT DOCUMENTS

| | | |
|---|---|---|
| CN | 108966322 A | 12/2018 |
| CN | 109495924 A | 3/2019 |
| CN | 110876185 A | 3/2020 |
| CN | 111345075 A | 6/2020 |
| WO | 2020032740 A1 | 2/2020 |

OTHER PUBLICATIONS

Extended European Search Report issued in corresponding European Application No. 20953545.9, mailed on Sep. 22, 2023, 10 pages.
"Summary for Potential Power Saving Enhancements", Agenda Item: 8.7.1.1, Source: Moderator (MediaTek), 3GPP TSG RAN WGI e-Meeting #102, RI-2007063, Aug. 17-28, 2020, 47 pages.
"Evaluation methodology and paging enhancements for idle/inactive mode UE power saving", Agenda Item: 8.7.1.1 Source: MediaTek Inc., 3GPP TSG RAN WG1 #102-e, R1-2005615, e-Meeting, Aug. 17-28, 2020, 11 pages.
"UE power saving for paging", Agenda Item: 7.2.9.3, Source: Huawei, HiSilicon, 3GPPTSG RANWGI Meeting#97, RI-1907521, Reno, USA, May 13-May 17, 2019, 3 pages.
CMCC, "Discussion on paging enhancement", R1-2006221, 3GPP TSG RAN WG1 #102-e e-Meeting, Aug. 17-28, 2020.
Samsung, "NB M2M—Discussions on paging procedure", Tdoc GP-150382, 3GPP GERAN2 Meeting #66 Vilnius, Lithuania May 25-28, 2015.
International Search Report issued in International Application No. PCT/CN2020/115381, mailed Jun. 16, 2021.
Written Opinion of the International Searching Authority issued in International Application No. PCT/CN2020/115381, mailed Jun. 16, 2021.
3GPP TS 38.331 V16.0.0 (Mar. 2020); Technical Specification Group Radio Access Network; NR; Radio Resource Control (RRC) protocol specification (Release 16).
3GPP TS 38.212 V16.1.0 (Mar. 2020); Technical Specification Group Radio Access Network; NR; Multiplexing and channel coding (Release 16).
Priority Review issued in corresponding Chinese Application No. 202310381277.2, mailed Jul. 1, 2024.
First Office Action issued in corresponding European Application No. 20953545.9, mailed Jul. 4, 2024.
First Office Action issued in corresponding Chinese Application No. 202310381277.2, mailed Jul. 10, 2024.

* cited by examiner

ENERGY SAVING METHOD, TERMINAL DEVICE, AND NETWORK DEVICE

CROSS-REFERENCE TO RELATED APPLICATION

This application is a continuation of PCT Patent Application No. PCT/CN2020/115381, entitled "ENERGY SAVING METHOD, TERMINAL DEVICE, AND NETWORK DEVICE" filed on Sep. 15, 2020, the disclosure of which is incorporated herein by reference in its entirety.

TECHNICAL FIELD

The embodiments of the present disclosure relate to the communication field, and in particular to an energy saving method, a terminal device, and a network device.

BACKGROUND

In order to reduce the power consumption of the terminal device, Discontinuous Reception (DRX) is introduced. During DRX Active Time, the terminal device monitors and receives a Physical Downlink Control Channel (PDCCH), and in DRX inactive period or dormant period (Opportunity for DRX), the terminal device does not monitor the PDCCH so as to reduce power consumption. The above DRX mechanism is applicable to terminal devices in a Radio Resource Control (RRC) connected state, and for terminal devices in a RRC non-connected state, such as a RRC idle state or inactive state, the main power consumption occurs in periodical reception of paging messages. Therefore, how to realize energy saving of the terminal device in the RRC non-connected state is an urgent problem to be solved.

SUMMARY

The embodiments of the present disclosure provide an energy saving method, a terminal device, and a network device, which can realize energy saving of the terminal device in the RRC non-connected state.

In a first aspect, an energy saving method is provided, including: receiving, by a terminal device, first information, the first information including paging power saving configuration information respectively corresponding to each terminal device group in multiple terminal device groups, wherein each terminal device group includes at least one terminal device, and the paging energy-saving configuration information corresponding to the terminal device group is used to determine whether to receive a paging message by the at least one terminal device in the terminal device group; and performing, by the terminal device, reception of the paging message according to the paging energy-saving configuration information corresponding to the terminal device group to which the terminal device belongs.

In a second aspect, an energy saving method is provided, including: sending, by a network device, first information, the first information including paging energy-saving configuration information corresponding to each terminal device group in multiple terminal device groups, wherein each terminal device group includes at least one terminal device, and the paging energy-saving configuration information corresponding to the terminal device group is used to configure whether to receive a paging message by the at least one terminal device in the terminal device group.

In a third aspect, a terminal device is provided, which is configured to perform the method in the foregoing first aspect or any possible implementation of the first aspect. Specifically, the terminal device includes one or more units for performing the method in the foregoing first aspect or any possible implementation of the first aspect.

In a fourth aspect, a network device is provided, which is configured to perform the method in the foregoing second aspect or any possible implementation of the second aspect. Specifically, the network device includes one or more units for performing the method in the foregoing second aspect or any possible implementation of the second aspect.

In a fifth aspect, there is provided a terminal device including a processor and a memory. The memory is used for storing a computer program, and the processor is configured to call and run the computer program stored in the memory to perform the method in the above-mentioned first aspect or the implementations thereof.

In a sixth aspect, there is provided a network device including a processor and a memory. The memory is used for storing a computer program, and the processor is configured to call and run the computer program stored in the memory to perform the method in the above second aspect or the implementations thereof.

In a seventh aspect, a chip is provided for implementing the method in any one of the first aspect to the second aspect or the implementations thereof. Specifically, the chip includes: a processor, configured to call and run a computer program from a memory to cause a device installed with the chip to perform the method in any one of the above-mentioned first aspect to the second aspect or the implementations thereof.

In an eighth aspect, there is provided a computer-readable storage medium for storing a computer program that causes a computer to perform the method in any one of the first to second aspects or the implementations thereof.

In a ninth aspect, there is provided a computer program product including computer program instructions that cause a computer to perform the method in any one of the first to second aspects or the implementations thereof.

In a tenth aspect, there is provided a computer program which, when running on a computer, causes the computer to perform the method in any one of the above first to second aspects or the implementations thereof.

DETAILED DESCRIPTION

Figure 1:
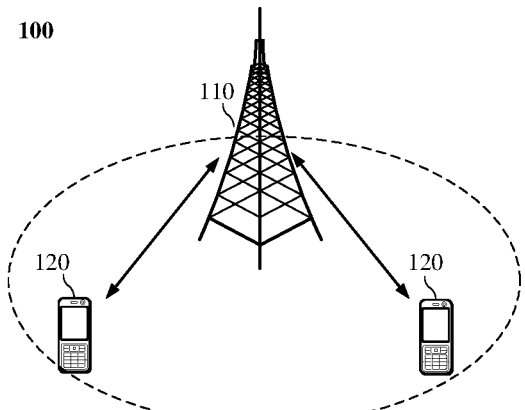
FIG. 1 is a schematic diagram of an application scenario provided in an embodiment of the present disclosure.

The technical solutions in the embodiments of the present disclosure will be described below in connection with the drawings in the embodiments of the present disclosure. Obviously, the embodiments described are part of the embodiments of the present disclosure, but not all the embodiments. All other embodiments obtained by those of ordinary skill in the art based on the embodiments in the present disclosure without creative work fall within the protection scope of the present disclosure.

The technical solutions of the embodiments of the present disclosure can be applied to various communication systems such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an Advanced long term evolution (LTE-A) system, a New Radio (NR) system, an evolution system of a NR system, a LTE-based access to unlicensed spectrum (LTE-U) system, a NR-based access to unlicensed spectrum (NR-U) system, a Non-Terrestrial Network (NTN) system, a Universal Mobile Telecommunication System (UMTS), a Wireless Local Area Network (WLAN), a Wireless Fidelity (Wi-Fi), a 5th-Generation (5G) communication system or other communication systems.

Generally, traditional communication systems support a limited number of connections and are easy to implement. However, with the development of communication technologies, mobile communication systems will not only support traditional communications, but will also support, for example, Device to Device (D2D) communication, machine to machine (M2M) communication, machine type communication (MTC), vehicle to vehicle (V2V) communication, Vehicle to everything (V2X) communication, etc. The embodiments of the present disclosure can also be applied to these communication systems.

Optionally, the communication system in the embodiments of the present disclosure can be applied to a carrier aggregation (CA) scenario, a dual connectivity (DC) scenario, or a standalone (SA) deployment scenario.

Optionally, the communication system in the embodiments of the present disclosure may be applied to an unlicensed spectrum, where the unlicensed spectrum may also be considered as a shared spectrum; or, the communication system in the embodiments of the present disclosure may also be applied to a licensed spectrum, where the licensed spectrum can also be considered an unshared spectrum.

Various embodiments are described in conjunction with the network device and the terminal device in the embodiments of the present disclosure, where the terminal device may also be referred to as User Equipment (UE), an access terminal, a subscriber unit, a subscriber station, a mobile station, a remote station, a remote terminal, a mobile device, a user terminal, a terminal, a wireless communication device, a user agent, a user device, or the like.

The terminal device may be a station (ST) in the WLAN, or may be a cellular phone, a cordless phone, a Session Initiation Protocol (SIP) phone, a Wireless Local Loop (WLL) station, a personal digital Personal Digital Assistant (PDA) device, a handheld devices with wireless communication capabilities, a computing device or other processing devices connected to a wireless modem, an in-vehicle device, a wearable device, a terminal device in next-generation communication systems such as a NR network, or a terminal device in a future evolved public land mobile network (PLMN) network, etc.

In the embodiments of the present disclosure, the terminal device can be deployed on land, including indoor or outdoor, handheld, wearable, or vehicle-mounted; or it can be deployed on water (such as on a ship, etc.); or it can be deployed in the air (such as on a airplane, a balloon, a satellite, etc.).

In the embodiments of the present disclosure, the terminal device may be a mobile phone, a Pad, a computer with a wireless transceiving function, a virtual reality (VR) terminal device, an augmented reality (AR) terminal device, a wireless terminal device in industrial control, a wireless terminal device in self driving, a wireless terminal device in remote medical, a wireless terminal device in smart grid, a wireless terminal device in transportation safety, a wireless terminal device in smart city, a wireless terminal device in smart home, or the like.

As an example instead of a limitation, in the embodiments of the present disclosure, the terminal device may also be a wearable device. The wearable device can also be referred to as a wearable smart device, which is a general term for wearable devices which are designed and developed by using wearable technology to intelligently design and develop everyday wear, such as glasses, gloves, watches, clothing and shoes. The wearable device is a portable device that is directly worn on the body or integrated into user's clothes or accessories. The wearable device is not only a hardware device, but also realizes powerful functions through software support, data interaction, and cloud interaction. In a broad sense, the wearable smart device includes full-featured and large-sized devices of which complete or partial functions can be achieved without relying on smart phones, such as smart watches or smart glasses, and devices which focus on only a certain type of application function and need to cooperate with other devices such as smart phones, such as various smart bracelets and smart jewelry for physical sign monitoring.

In the embodiments of the present disclosure, the network device can be a device used to communicate with a mobile device. The network device can be an access point (AP) in WLAN, a Base Transceiver Station (BTS) in GSM or CDMA, or a NodeB (NB) in WCDMA, and can also be an Evolutional Node B (eNB or eNodeB) in LTE, a relay station, an access point, a vehicle-mounted device, a wearable device, a network device (gNB) in a NR network, a network device in future evolutional PLMN network, a network device in a NTN network, or the like.

As an example but not a limitation, in the embodiments of the present disclosure, the network device may have a mobile feature, for example, the network device may be a moving device. Optionally, the network device may be a satellite or a balloon station. For example, the satellite may be a low earth orbit (LEO) satellite, a medium earth orbit (MEO) satellite, a geostationary earth orbit (GEO) satellite, a High Elliptical Orbit (HEO) satellite, etc. Optionally, the network device may also be a base station set in a location such as on land or in water.

In the embodiments of the present disclosure, the network device may provide services for a cell, and the terminal device communicates with the network device through transmission resources (for example, frequency domain resources, or spectrum resources) used by the cell. The cell may be a cell corresponding to the network device (e.g., a cell corresponding to the base station), or belong to a macro base station or a base station corresponding to a small cell. The small cell herein can include a Metro cell, a Micro cell, a Pico cell, a Femto cell, etc., which are characterized in small coverage and low transmission power, and are suitable for providing high-rate data transmission services.

Exemplarily, a communication system 100 to which the embodiments of the present disclosure are applied is as shown in FIG. 1. The communication system 100 may include a network device 110 which may be a device that communicates with a terminal device 120 (or referred to as a communication terminal or a terminal). The network device 110 can provide communication coverage for a specific geographic area, and can communicate with terminal devices located in the coverage area.

FIG. 1 exemplarily shows one network device and two terminal devices. Optionally, the communication system 100 may include multiple network devices and other numbers of terminal devices can be included in the coverage of each network device, which is not particularly limited in the embodiments of the present disclosure.

Optionally, the communication system 100 may also include other network entities such as a network controller and a mobility management entity, which are not limited in the embodiments of the present disclosure.

It should be understood that the device with a communication function in the network and/or system of the embodiments of the present disclosure may be referred to as the communication device. Taking the communication system 100 shown in FIG. 1 as an example, the communication device may include a network device 110 and a terminal device 120 which have the communication function. The network device 110 and the terminal device 120 may be the specific devices as described above, which will not be repeated here. The communication device may also include other devices in the communication system 100, such as a network controller, a mobility management entity, and other network entities, which are not limited in the embodiments of the present disclosure.

It should be understood that the terms "system" and "network" are often used interchangeably herein. The term "and/or" used herein is merely to describe relative relationships of relative objects, indicating that there can be three kinds of relationships. For example, A and/or B can indicate three cases where A exists alone, A and B exist simultaneously, or B exists alone. In addition, the character "/" used herein generally indicates that the related objects before and after this character are in an "or" relationship.

It should be understood that "indicate" mentioned in the embodiments of the present disclosure may be a direct indication or an indirect indication, or may represent an associated relationship. For example, if A indicates B, it may represent that A directly indicates B, for example, B can be obtained from A; or it may represent that A indicates B indirectly, for example, A indicates C, and B can be obtained from C; or it may represent that there is an associated relationship between A and B.

In the description of the embodiments of the present disclosure, the term "corresponding" may indicate that there is a direct or indirect corresponding relationship between two objects, or may indicate that there is an associated relationship, a relationship of indicating and being indicated, or a relationship of configuring and being configured between the two objects, and so on.

In consideration of power saving of the terminal device, the DRX transmission mechanism is introduced to realize discontinuous reception of signals in the time domain through semi-static configuration. The power consumption can be reduced by stopping receiving PDCCH (at this time, PDCCH blind detection will be stopped) when there is no data transmission.

Figure 2:
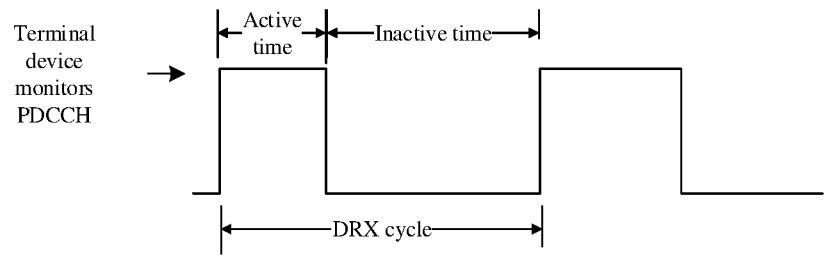
FIG. 2 is a schematic diagram of a DRX cycle provided by an embodiment of the present disclosure.

Specifically, a DRX cycle is configured for a terminal device in a Radio Resource Control (RRC) connected state (RRC_CONNECTED). As shown in FIG. 2, continuous DRX cycles are divided in the time domain. The DRX cycle consists of an Active Time (or referred to as ON Duration) and an inactive period or dormancy period (Opportunity for DRX). In the ON Duration, the terminal device monitors and receives downlink channels and downlink signals including a PDCCH; and during the inactive period or dormancy period (Opportunity for DRX), the terminal device does not receive the downlink channels and downlink signals such as the PDCCH so as to reduce power consumption. It should be noted that the Opportunity for DRX is the inactive period or dormancy period of the DRX.

The terminal device in the RRC idle state can receive the paging message in a similar manner to DRX. There is a paging occasion (PO) within one DRX cycle, and the terminal device only receives the paging message in the PO, and does not receive the paging message at times other than the PO, to achieve the purpose of power saving. During the PO, the UE determines whether there is a paging message by detecting the PDCCH scrambled with a Paging Radio Network Temporary Identity (P-RNTI).

Although the network device configures the DRX mechanism for the terminal device, the terminal device is only opportunistically scheduled in the On Duration that occurs periodically, and is even scheduled in only several DRX cycles when the service load of the terminal device is very low, and for the paging message using the DRX mechanism, there are even fewer opportunities for the terminal device to receive the paging message. Therefore, when the terminal device is configured with the DRX mechanism, data scheduling is still not detected in the PDCCH detection in most of the on-durations. If the terminal device blindly detects the PDCCH when there is no data scheduling, the detection power will be wasted. Therefore, there is still optimization space for the current DRX mechanism.

Figure 3:
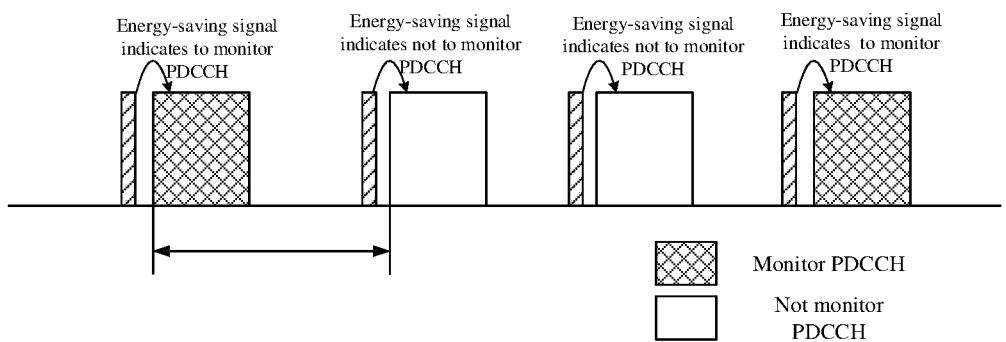
FIG. 3 is a schematic diagram of an energy-saving signal indicating whether to monitor a PDCCH.

The DRX enhancement mechanism is introduced in 5G and LTE evolution projects. When the network device determines that the terminal device needs to be scheduled during the DRX ON duration, it sends an energy-saving signal to the terminal device. The energy-saving signal is used to wake up the terminal device. When the terminal device has data transmission in a DRX cycle, the energy-saving signal is used to "wake up" the terminal device to monitor the PDCCH during DRX On duration; otherwise, when the terminal device has no data transmission in a DRX cycle, the energy-saving signal does not "wake up" the terminal device, and the terminal device does not need to monitor the PDCCH during the DRX On Duration. Compared with the previous DRX mechanism, when the terminal device has no data transmission, the terminal device can omit the PDCCH monitoring during the DRX On duration, thereby realizing energy saving. FIG. 3 is a schematic diagram of indicating to the terminal whether to monitor the PDCCH during the DRX On duration through the energy-saving signal.

The main function of paging is to enable the network device to page the UE through a paging message when the UE is in a Radio Resource Control (RRC) idle state or RRC inactive state, or notify the UE of system message changes or earthquake and tsunami/public warning information through short messages (applicable to all RRC states of the UE, including the RRC connected state).

For a UE in the RRC_IDLE state or RRC_INACTIVE state, since there is no other data communication between the UE and the network, for the purpose of power saving of the terminal, the UE can discontinuously monitor the paging message, that is, use paging Discontinuous Reception (DRX) mechanism. Under the Paging DRX mechanism, the UE only needs to monitor the paging during one Paging Occasion (PO) in each DRX cycle.

Optionally, the PO is composed of a series of PDCCH monitoring opportunities, where each PDCCH monitoring opportunity may include one or more slots. Specifically, in a DRX cycle, the terminal device can monitor the PDCCH on the PO in a Paging Frame (PF). The PF may refer to a radio frame, which can be of, for example, a fixed 10 ms, and the radio frame may include one or more POs, or starting positions of one or more POs.

Optionally, the cycle of Paging DRX is jointly determined by a common cycle in system broadcast and a dedicated cycle configured in higher layer signaling, such as Non-Access Stratum (NAS) signaling. For example, the UE can take a minimum cycle of the two as the Paging Cycle.

From the perspective of the network, there can be multiple POs in a paging DRX cycle, a position of the PO where the UE monitors the PDCCH is related to the UE_ID, and the UE only needs to perform monitoring in its own PO. The PF and PO at which a certain UE monitors the PDCCH in a Paging DRX can be determined as follows.

For example, a System Frame Number (SFN) of the PF is determined from the following formula:

$$(SFN+PF\_offset) \bmod T=(T/N)*(UE\_ID \bmod N)$$

An index (i_s) of a PO in a PF is determined from the following formula:

$$i\_s=\text{floor}(UE\_ID/N) \bmod Ns$$

where mod represents modulus operation, and T represents a DRX cycle for the UE to receive the paging. In some implementations, the network can broadcast a default DRX cycle. If the higher layer of the network device, for example, a RRC layer, configures a UE-specific DRX cycle for the UE, the UE can use the minimum of the DRX cycle broadcast by the network and the UE-specific DRX cycle configured by the higher layer as the DRX cycle of the UE. If the higher layer of the network device does not configure a UE-specific DRX cycle for the UE, the UE may use the DRX cycle broadcast by the network as the DRX cycle of the UE.

N represents the number of PFs included in one DRX cycle;

Ns represents the number of POs included in a PF;

PF_offset represents a time-domain offset used to determine the PF; and

UE_ID may be, for example, 5G-S-TMSI mod 1024, where 5G-S-TMSI is a 5G shortened Temporary Mobile Subscriber Identity (TMSI).

For a terminal device in the RRC non-connected state, the main power consumption occurs in periodically receiving the paging message. Therefore, how to realize the energy saving of the terminal device in the RRC non-connected state is an urgent problem to be solved.

Figure 4:
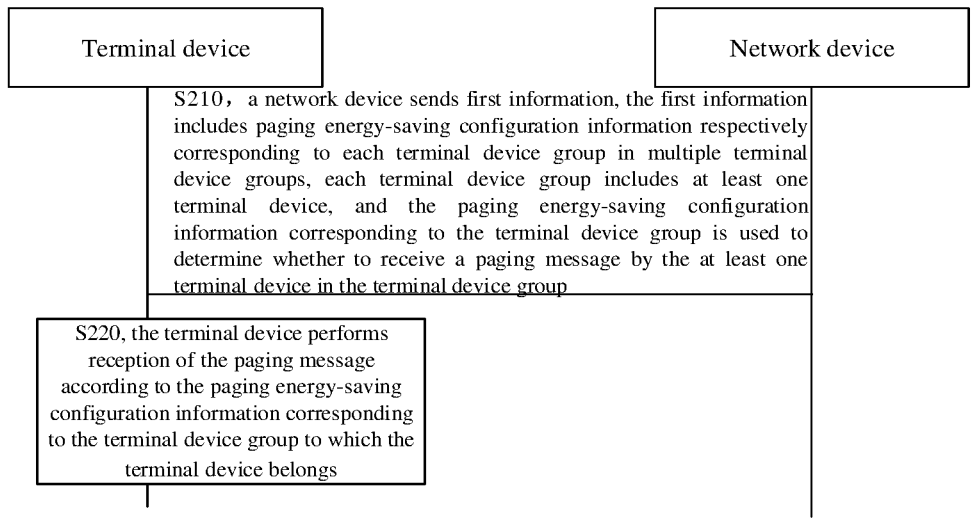
FIG. 4 is a schematic diagram of an energy saving method provided by an embodiment of the present disclosure.

FIG. 4 is a schematic interactive diagram of an energy saving method 200 provided in an embodiment of the present disclosure. As shown in FIG. 4, the method 200 may include at least part of the following.

In S210, a network device sends first information, where the first information includes paging energy-saving configuration information respectively corresponding to each terminal device group in multiple terminal device groups, each terminal device group includes at least one terminal device, and the paging energy-saving configuration information corresponding to the terminal device group is used to determine whether to receive a paging message by the at least one terminal device in the terminal device group.

Correspondingly, the terminal device receives the first information.

In S220, the terminal device performs reception of the paging message according to the paging energy-saving configuration information corresponding to the terminal device group to which the terminal device belongs.

It should be understood that the terminal device may be the terminal device 120 in the embodiment shown in FIG. 1, and the network device may be the network device 110 in the embodiment shown in FIG. 1.

In an embodiment of the present disclosure, the terminal device is in an RRC non-connected state, such as an RRC Idle state or an RRC inactive state.

Optionally, in some embodiments, the multiple terminal device groups belong to a paging group, that is, one paging group may include multiple terminal device groups, or one terminal device group may also be considered as a paging subgroup, that is, one paging group can include multiple paging subgroups.

Therefore, in an embodiment of the present disclosure, a paging group can be divided into multiple terminal device groups, and by configuring corresponding paging energy-saving configuration information for each terminal device group, reception of the paging messages is controlled in units of terminal device groups, which can achieve a better energy-saving effect compared with the paging message reception control in units of paging groups. This is because when controlling the reception of the paging messages in units of paging groups, if only some of the terminal devices in a paging group need to receive the paging message, the network device have to indicate all the terminal devices in the paging group to receive the paging message, resulting in power consumption for terminal devices that do not need to receive the paging message.

In some embodiments, the terminal devices that correspond to the same PF or PO can be considered as belonging to one paging group. For the calculation method of the PF and PO, please refer to the description above.

In some embodiments, the terminal device can determine the terminal device group to which it belongs. For example, the terminal device group to which the terminal device belongs may be determined according to a preset rule. Correspondingly, the network device may also determine the terminal device group to which each terminal device belongs according to the preset rule, and further configure corresponding paging energy-saving configuration information for each terminal device group.

As an example, the preset rule may be to determine the terminal device group to which the terminal device belongs according to an Identify (ID) of the terminal device.

Optionally, the ID of the terminal device may be, for example, 5G-S-TMSI mod 1024, or may be other identification information that can identify the terminal device, and the present disclosure is not limited thereto.

In some embodiments, the terminal device group to which the terminal device belongs can be determined according to the following formula:

Index_UEGroup=$UE\_ID$ mod $N\_UEGroup$ where Index_UEGroup is an index of the terminal device group, and N_UEGroup is the total number of the multiple terminal device groups.

Optionally, in some embodiments, the first information may be carried in Downlink Control Information (DCI), or may be carried in other downlink signals, downlink channels or downlink messages, for example, it may be carried in a downlink reference signal sequence. Hereinafter, description will be made by taking the first information carried in the DCI as an example, but the present disclosure is not limited thereto.

Optionally, the DCI may be a DCI format 2_6 or DCI format 1_0, or other DCI formats, and the present disclosure is not limited thereto.

Optionally, in some embodiments, the DCI may include multiple information blocks, and each information block is used to carry paging energy-saving configuration information corresponding to one terminal device group.

In an embodiment of the present disclosure, after receiving the first information, the terminal device may determine a position of the paging energy saving configuration information corresponding to the terminal device group to which the terminal device belongs in the first information.

In some embodiments, the paging energy-saving configuration information corresponding to the multiple terminal device groups are arranged according to a preset rule. The preset rule may be a rule that both the terminal device and the network device can know, and when generating the first information, the network device arranges the paging energy-saving configuration information corresponding to each terminal device group according to the preset rule, and the terminal device can also determine the position of the paging energy-saving configuration information corresponding to the terminal device group to which it belongs according to the preset rule, and obtain the paging energy-saving configuration information accordingly.

In some embodiments, the first information is carried in the DCI, and information blocks in the DCI may have correspondence with the terminal device groups. The terminal device can determine the position of the paging energy-saving configuration corresponding to the terminal device group it belongs to in the DCI according to the terminal device group it belongs to in combination with the correspondence.

In an embodiment, the terminal device may determine, according to the ID of the terminal device, the position of the paging energy-saving configuration information corresponding to the terminal device group to which the terminal device belongs in the first information.

As an example, the terminal device may determine, according to the ID of the terminal device and the total number of the multiple terminal device groups (or in other words, the total number of pieces of paging energy-saving configuration information corresponding to the multiple terminal device groups, or the number of the multiple signal blocks), the position of the paging energy-saving configuration information corresponding to the terminal device group to which the terminal device belongs in the first information.

Assuming that there are N terminal device groups, there are N pieces of paging energy-saving configuration information, the N terminal device groups correspond to the N pieces of paging energy-saving configuration information on a one-to-one basis, and each paging energy-saving configuration information corresponds to a respective index, marked as Index_UEGroup_Config. As an example, Index_UEGroup_Config=UE_ID mod N.

In some other embodiments, the first information is carried in a reference signal sequence. In this case, different terminal device groups can be indicated by different reference signal sequences or time-frequency resources for transmitting the reference signal sequences, or in other words, the paging energy-saving configuration information for different terminal device groups are carried by different reference signal sequences, or the reference signal sequences carrying the paging energy-saving configuration information corresponding to different terminal device groups are transmitted via different time-frequency resources.

It should be understood that the specific implementations of the paging energy-saving configuration information corresponding to each terminal device are not limited in the embodiments of the present disclosure. For example, several typical implementations are explained in conjunction with Embodiment 1 to Embodiment 4.

Embodiment 1

The paging energy saving configuration information corresponding to the terminal device group includes one piece of paging energy-saving indication information, and the one piece of paging energy-saving indication information is used to indicate whether to receive a paging message by at least one terminal device in the terminal device group.

That is, each terminal device group may correspond to one piece of paging energy-saving indication information, and the paging energy-saving indication information is used to indicate whether to receive the paging message by at least one terminal device in the terminal device group.

It should be understood that in Embodiment 1, whether to receive the paging message by the at least one terminal device in the terminal device group may refer to whether to receive the paging message by the terminal device group within a specific time period. The specific time period may refer to a PF or PO corresponding to the terminal device group, and for the calculation method of the PF or PO corresponding to the terminal device group, please refer to the foregoing description.

In some embodiments, the paging energy-saving indication information corresponding to each terminal device group may be 1 bit. Different values of the 1 bit are used to indicate whether to receive the paging message by at least one terminal device in the terminal device group or not. For example, the 1 bit with a value of 1 indicates to receive the paging message, and a value of 0 indicates not to receive the paging message, or vice versa.

In some embodiments, the first information is carried in a DCI format 2_6, and the DCI format 2_6 includes multiple information blocks, and each information block includes wake-up indication bits and secondary cell dormancy indication bits. As an example, the paging energy-saving configuration information corresponding to each terminal device group is carried in an information block in DCI format 2_6. More specifically, the paging energy-saving indication information corresponding to the terminal device group can be carried in the wake-up indication bits of the information block in the DCI format 2_6.

Figure 5:
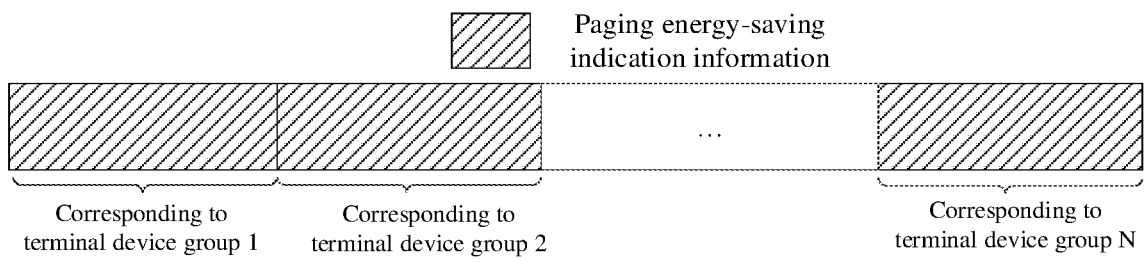
FIG. 5 is an example of a format of first information according to an embodiment of the present disclosure.
Figure 6:
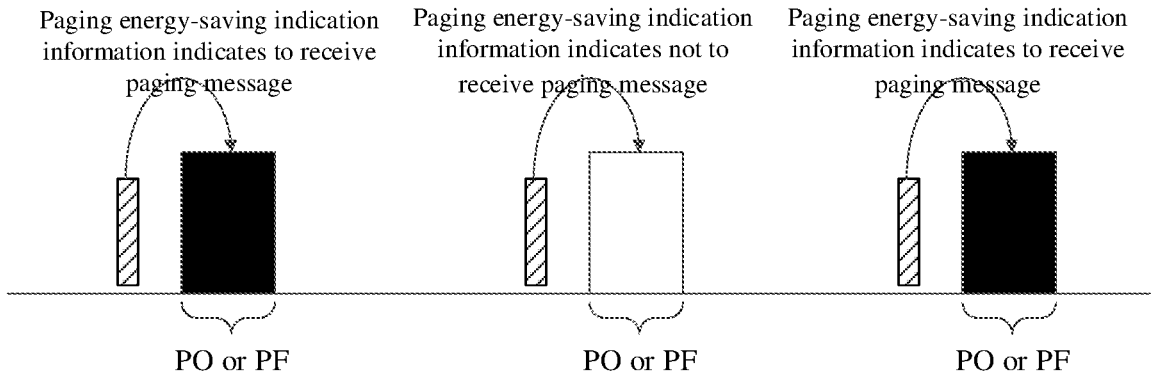
FIG. 6 is a schematic diagram of paging energy-saving indication information indicating whether to receive a paging message.

FIG. 5 shows an example of the format of the first information based on Embodiment 1. The first information can carry the paging energy-saving indication information of N terminal device groups, and the paging energy-saving indication information of each terminal device group is used to indicate whether to receive the paging message by the corresponding terminal device group, as shown in FIG. 6.

Embodiment 2

The paging energy-saving configuration information corresponding to the terminal device group includes one piece of paging energy-saving indication information and time information corresponding to the paging energy-saving indication information.

The paging energy-saving indication information is used to indicate whether to receive a paging message by at least one terminal device in the terminal device group, and the time information corresponding to the paging energy-saving indication information indicates a valid time period corresponding to the contents indicated by the paging energy-saving indication information. It should be understood that the valid time period here may be continuous, for example, a continuous period of time, or may be discrete, such as discrete POs or PFs, which are not limited in the present disclosure.

Then, the terminal devices in each terminal device group can determine, according to the corresponding paging energy-saving indication information and the valid time period corresponding to the content indicated by the paging energy-saving indication information, whether to receive the paging message within the valid time period.

By configuring the valid time period of the content indicated by the paging energy-saving indication information, the time period for receiving the paging message can be more flexibly indicated to the terminal device, thereby saving signaling overhead and further improving the energy-saving effect.

Optionally, in Embodiment 2, reference may be made to the relevant description in Embodiment 1 for the implementations of the paging energy-saving indication information, which are not repeated here for the sake of brevity.

Optionally, the time period indicated by the time information corresponding to the paging energy-saving indication information includes one or more paging frames (PFs) and/or one or more paging occasions (POs). For example, the time information corresponding to the paging energy-saving indication information may indicate the number of the PFs or POs.

Optionally, if the time period indicated by the time information corresponding to the paging energy-saving indication information includes a first time period, the terminal device considers that the PF and/or PO within the first time period corresponds to the paging energy-saving indication information, that is, the PF and/or PO within the first time period is the valid time corresponding to the paging energy-saving indication information. Further, the terminal devices in the terminal device group receive the paging message or do not receive the paging message on one or more PFs or POs within the first time period according to the paging energy-saving indication information.

Optionally, in some embodiments, the time period indicated by the time information corresponding to the paging energy-saving indication information is a time period applicable to the paging energy-saving indication information corresponding to the terminal device group, or is a common time period applicable to the paging energy-saving indication information corresponding to the multiple terminal device groups.

That is, the valid time period of the paging energy-saving indication information corresponding to each terminal device group may be specific to each terminal device group (that is, per UE group), or the valid time period of the paging energy-saving indication information corresponding to each terminal device group may be common, for example, a common valid time period based on cell configuration.

In some embodiments, the meaning of the time period indicated by the time information corresponding to the paging energy-saving indication information is predefined or is configured by the network device. For example, the time period indicated by the time information corresponding to the paging energy-saving indication information included in the first information is predefined as a common valid time period, or the network device configures the time period indicated by the time information corresponding to the paging energy-saving indication information included in the first information as a common valid time period. As an example, the network device may configure the meaning of the time period indicated by the time information corresponding to the paging energy-saving indication information through paging configuration information.

In the embodiments of the present disclosure, "predefined" can be realized by pre-saving corresponding codes, tables or other measures that can be used to indicate related information in the device (for example, including the terminal device and network device), and the implementations thereof are not limited in the present disclosure. For example, "pre-defined" may refer to being defined in a protocol.

In the embodiments of the present disclosure, the term "protocol" may refer to a standard protocol in the communication field, for example, it may include but is not limited to the LTE protocol, the NR protocol, and related protocols applied in future communication systems.

It should be understood that the specific indication manner of the time information corresponding to the paging energy-saving indication information is not limited in the embodiments of the present disclosure.

As an example, the time information corresponding to the paging energy-saving indication information includes a first bit map, the first bit map includes a plurality of bits, each bit corresponds to a specific time period, and different values of each bit are used to indicate whether to receive the paging message or not in the corresponding time period.

Optionally, the time period corresponding to each bit can be continuous, for example, a continuous period of time, and in this case, it can also be considered that each bit corresponds to the PF or PO in the period of time; or, the time period corresponding to each bit may be discrete, for example, a plurality of discrete POs, etc.

Optionally, in some embodiments, the time period corresponding to each bit includes at least one PF and/or at least one PO.

It should be understood that, in some embodiments, the time information corresponding to the paging energy-saving indication information may also indicate an invalid time period corresponding to the content indicated by the paging energy-saving indication information, and then the terminal device in the terminal device group may determine the PFs and POs excluding the invalid time period among the PFs and POs corresponding to the terminal device group, as the valid time period corresponding to the paging energy-saving indication information.

Optionally, if the first information is carried in DCI, the DCI is DCI format 2_6, and in some embodiments, the time information corresponding to the paging energy-saving indication information is carried in the secondary cell dormancy indication bits in DCI format 2_6.

Figure 7:
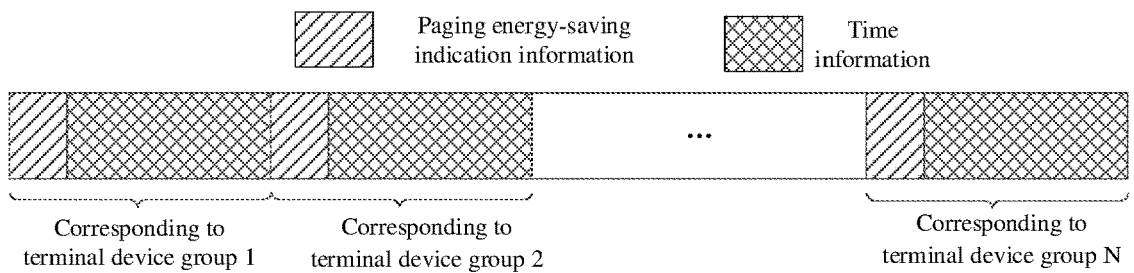
FIG. 7 is another example of the format of the first information according to an embodiment of the present disclosure.
Figure 8:
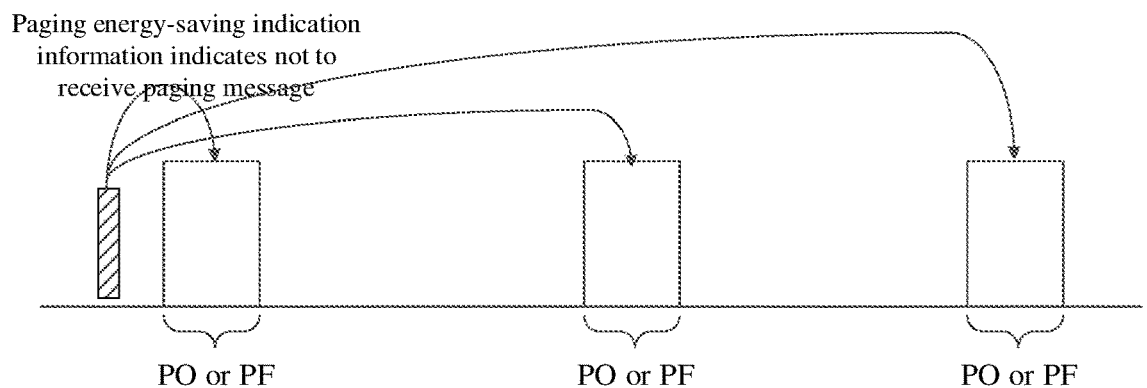
FIG. 8 is an example of time information corresponding to the paging energy-saving indication information.

FIG. 7 shows an example of the format of the first information based on Embodiment 2. The first information can carry pieces of paging energy-saving indication information each of which corresponds to each terminal device group in the N terminal device groups and the time information corresponding to each piece of the paging energy-saving indication information. The paging energy-saving indication information of each terminal device group is used to indicate whether to receive the paging message by the corresponding terminal device group, and the time information corresponding to each paging energy-saving indication information may include one or at least one PF and/or at least one PO, as shown in FIG. 8.

Embodiment 3

The paging energy-saving configuration information corresponding to each terminal device group includes a plurality of pieces of paging energy-saving indication information and time information respectively corresponding to each paging energy-saving indication information in the plurality of pieces of paging energy-saving indication information.

The paging energy-saving indication information is used to indicate whether to receive a paging message by at least one terminal device in the terminal device group, and the time information corresponding to the paging energy-saving indication information indicates a valid time period corresponding to the content indicated by the paging energy-saving indication information.

Then, the terminal devices in each terminal device group can determine, according to the plurality of pieces of paging energy-saving indication information and the valid time periods respectively corresponding to the contents indicated by the plurality of pieces of paging energy-saving indication information, whether to receive the paging message within the valid time periods.

By configuring a plurality of pieces of paging energy-saving indication information and valid time periods respectively corresponding to the contents indicated by the plurality of pieces of paging energy-saving indication information for each terminal device group, the time periods for terminal device to receive the paging message can be more flexibly indicated, thereby saving signaling overhead and further improving the energy saving effect.

Optionally, in Embodiment 3, reference may be made to the relevant description in Embodiment 1 for the implementations of the paging energy-saving indication information, which are not repeated here for the sake of brevity.

Optionally, in Embodiment 3, reference may be made to the relevant description in Embodiment 2 for the implementations of the time information corresponding to the paging energy-saving indication information, which are not repeated here for the sake of brevity.

Figure 9:
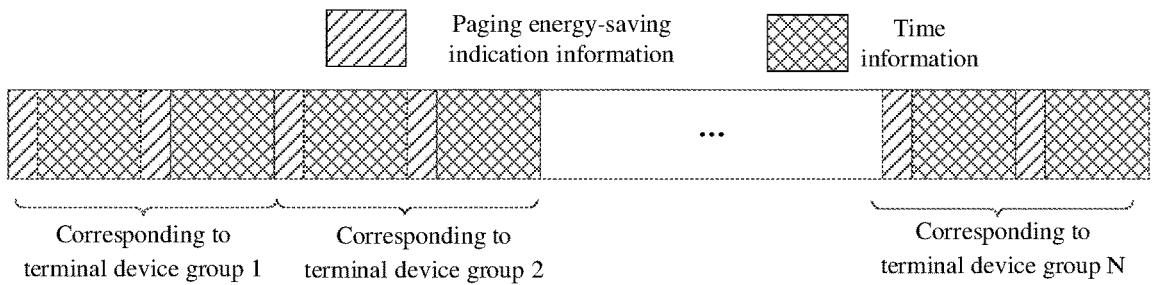
FIG. 9 is another example of the format of the first information according to an embodiment of the present disclosure.

FIG. 9 shows an example of the format of the first information based on Embodiment 3. The first information can carry a plurality of pieces of paging energy-saving indication information corresponding to each of the N terminal device groups and time information corresponding to each piece of paging energy-saving indication information, each paging energy-saving indication information is used to indicate whether to receive the paging message by the corresponding terminal device group, and the time information corresponding to each paging energy-saving indication information is used to indicate a valid time period of the content indicated by the paging energy-saving indication information.

Embodiment 4

The paging energy-saving configuration information corresponding to the terminal device group includes a plurality of pieces of paging energy-saving indication information, and each piece of paging energy-saving indication information is used to indicate whether to receive the paging message by at least one terminal device in the terminal device group, and each paging energy-saving indication information corresponds to a specific time period.

Then, the terminal devices in each terminal device group can determine, according to the plurality of pieces of paging energy-saving indication information and the time periods respectively corresponding to the plurality of pieces of paging energy-saving indication information, whether to receive the paging message within the valid time periods.

By configuring a plurality of pieces of paging energy-saving indication information for each terminal device group, it can more flexibly indicate the time period for the terminal device to receive the paging message, thereby save signaling overhead, and further improving energy-saving effect.

Optionally, the time period corresponding to each paging energy-saving indication information in the plurality of pieces of paging energy-saving indication information may be predefined, or may be configured by the network device. For example, it is configured through paging configuration information.

Optionally, reference may be made to the relevant description in Embodiment 2 for the implementations of the time information corresponding to the paging energy-saving indication information, which are not repeated here for the sake of brevity.

Figure 10:
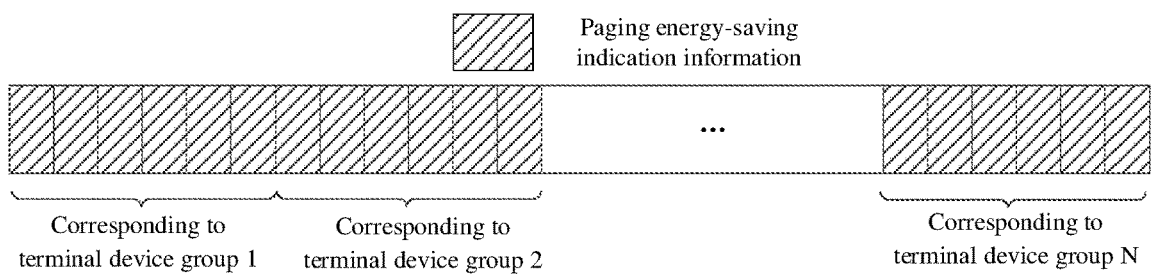
FIG. 10 is still another example of the format of the first information according to an embodiment of the present disclosure.

FIG. 10 shows an example of the format of the first information based on Embodiment 4. The first information can carry a plurality of pieces of paging energy-saving indication information corresponding to each of the N terminal device groups. Each paging energy-saving indication information is used to indicate whether to receive the paging message by the corresponding terminal device group, and each paging energy-saving indication information corresponds to a respective valid time period, so that more refined control over reception of the paging message by the terminal device can be realized.

It should be understood that those shown in FIG. 5 to FIG. 10 are only examples, and there can be other possible implementations of the paging energy-saving configuration information, and other implementations obtained according to the teaching in the embodiments of the present disclosure all fall within the protection scope of the embodiments of the present disclosure.

Optionally, in some embodiments, an information field in an existing DCI format may be multiplexed to carry the first information.

For example, for DCI format 2_6, the paging energy-saving configuration information corresponding to each terminal device group may be carried in an information block in the DCI format 2_6.

Optionally, if the size of an information block in DCI format 2_6 is not enough to carry the paging energy-saving configuration information corresponding to one terminal device group, for example, the size of one information block is 6 bits, and the paging energy-saving configuration information corresponding to the terminal device group needs 8 bits, in this case, the size of the information blocks in the DCI format 2_6 can be re-divided so that each information block is of enough size to carry the paging energy-saving configuration information corresponding to one terminal device group.

Optionally, in some embodiments, an information field in DCI format 1_0 may be multiplexed to carry the first information.

In related technologies, DCI format 1_0 may carry short message indicator information (2 bits), short message information (8 bits), and scheduling information of a PDSCH carrying a paging message. The short message indicator information indicates contents carried by the DCI, as shown in the table below.

| bit field value | Short Message indicator |
|---|---|
| | Reserved |
| | Only scheduling information for Paging is present in the DCI |
| | Only short message is present in the DCI |
| | Scheduling information for Paging and short message are present in the DCI |

As an example, by setting the value of the Short Message indicator in the DCI format 1_0 as 00, it represents that the DCI is used to indicate information related to paging energy saving, and the first information is further carried by other information fields in the DCI format 1_0. For example, the first information is carried by the short message information field and/or the PDSCH scheduling information field in the DCI format 1_0.

As another example, the value of the Short Message indicator in the DCI format 1_0 may be set to 10, and the first information is further carried by other information fields in the DCI format 1_0. For example, the first information is carried by the short message information field and/or the PDSCH scheduling information field in the DCI format 1_0.

In some embodiments, for DCI format 1_0, the information field used to carry the first information in DCI format 1_0 may also be divided into multiple information blocks, each of which is used to carry the paging energy-saving configuration information corresponding to each terminal device group, and a specific size of each information block may be determined according to the size of the paging energy-saving configuration information corresponding to each terminal device group, which is not limited in the present disclosure.

To sum up, in the embodiments of the present disclosure, the paging group is divided into multiple terminal device groups, each terminal device group is further configured with corresponding paging energy-saving configuration information, and the reception of the paging message is controlled in units of terminal device groups, which can realize more refined control on reception of the paging message by the terminal device, thereby improving the energy saving effect.

The method embodiments of the present disclosure are described in detail above with reference to FIGS. 4 to 10, and the device embodiments of the present disclosure are described in detail below in conjunction with FIGS. 11 to 15. It should be understood that the device embodiments and the method embodiments correspond to each other, and for similar description, reference can be made to the method embodiments.

Figure 11:
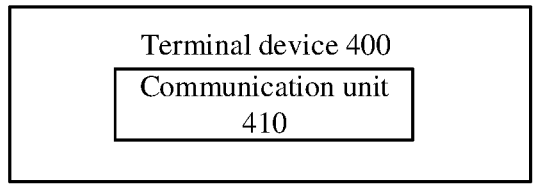
FIG. 11 is a schematic block diagram of a terminal device according to an embodiment of the present disclosure.

FIG. 11 is a schematic block diagram of a terminal device 400 according to an embodiment of the present disclosure. As shown in FIG. 11, the terminal device 400 includes a communication unit 410.

The communication unit 410 is configured to receive first information, the first information including paging energy-saving configuration information corresponding to each terminal device group in multiple terminal device groups, wherein each terminal device group includes at least one terminal device, and the paging energy-saving configuration information corresponding to the terminal device group is used to determine whether to receive a paging message by at least one terminal device in the terminal device group; and to perform reception of the paging message according to the paging energy-saving configuration information corresponding to the terminal device group to which the terminal device belongs.

Optionally, in some embodiments, the paging energy-saving configuration information corresponding to the terminal device group includes a piece of paging energy-saving indication information, and the piece of paging energy-saving indication information is used to indicate whether to receive the paging message by the at least one terminal device in the terminal device group.

Optionally, in some embodiments, the paging energy-saving configuration information corresponding to the terminal device group includes at least one piece of paging energy-saving indication information and time information respectively corresponding to the at least one piece of paging energy-saving indication information, the paging energy-saving indication information is used to indicate whether to receive a paging message by at least one terminal device in the terminal device group, and the time information corresponding to the paging energy-saving indication information indicates a valid time period corresponding to the contents indicated by the paging energy-saving indication information.

Optionally, in some embodiments, the time period indicated by the time information corresponding to the paging energy-saving indication information includes one or more paging frames PFs, or includes one or more paging occasions POs.

Optionally, in some embodiments, the time period indicated by the time information corresponding to the paging energy-saving indication information is a valid time period of the paging energy-saving indication information corresponding to the terminal device group, or is a common valid time period of the paging energy-saving indication information corresponding to the multiple terminal device groups.

Optionally, in some embodiments, the meaning of the time period indicated by the time information corresponding to the paging energy-saving indication information is predefined or is configured by the network device.

Optionally, in some embodiments, the meaning of the time period indicated by the time information corresponding to the paging energy-saving indication information is configured through paging configuration information.

Optionally, in some embodiments, the time information corresponding to the paging energy-saving indication information includes a first bit map, the first bit map includes a plurality of bits, each bit corresponds to a specific time period, and different values of each bit are used to indicate whether to receive the paging message or not in the corresponding time period.

Optionally, in some embodiments, the paging energy-saving configuration information corresponding to the terminal device group includes a plurality of pieces of paging energy-saving indication information, where each piece of paging energy-saving indication information corresponds to a specific time period, and the paging energy-saving indication information is used to indicate whether to receive a paging message by at least one terminal device in the terminal device group within the time period corresponding to the paging energy-saving indication information.

Optionally, in some embodiments, the time period corresponding to each paging energy-saving indication information is predefined or is configured by a network device.

Optionally, in some embodiments, the time period corresponding to each piece of paging energy-saving indication information is configured through paging configuration information.

Optionally, in some embodiments, the specific time period includes at least one PF and/or at least one PO.

Optionally, in some embodiments, the terminal device 400 further includes:

a processing unit, configured to determine the terminal device group to which the terminal device belongs according to a preset rule.

Optionally, in some embodiments, the preset rule is used to indicate to determine the terminal device group to which the terminal device belongs according to an identity (ID) of the terminal device.

Optionally, in some embodiments, the multiple terminal device groups belong to one paging group.

Optionally, in some embodiments, the terminal device 400 further includes:

a processing unit, configured to determine a position of the paging energy-saving configuration information corresponding to the terminal device group to which the terminal device belongs in the first information.

Optionally, in some embodiments, the processing unit is specifically configured to:

determine the position of the paging energy-saving configuration information corresponding to the terminal device group to which the terminal device belongs in the first information, according to the identity ID of the terminal device.

Optionally, in some embodiments, the first information is carried in downlink control information DCI.

Optionally, in some embodiments, the DCI includes multiple information blocks, and each information block is used to carry the paging energy-saving configuration information corresponding to one terminal device group.

Optionally, in some embodiments, the DCI is a DCI format 2_6 or a DCI format 1_0.

Optionally, in some embodiments, the communication unit may be a communication interface or a transceiver, or an input/output interface of a communication chip or a system-on-chip. The processing unit may be one or more processors.

It should be understood that the terminal device 400 according to the embodiments of the present disclosure can correspond to the terminal device in the method embodiments of the present disclosure, and the above-mentioned and other operations and/or functions of the units in the terminal device 400 are used to implement the process for the terminal device in method 200 as shown in FIG. 4, which will not be repeated here for the sake of brevity.

Figure 12:
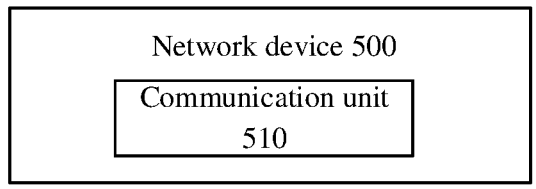
FIG. 12 is a schematic block diagram of a network device according to an embodiment of the present disclosure.

FIG. 12 is a schematic block diagram of a network device according to an embodiment of the present disclosure. The network device 500 of FIG. 12 includes:

a communication unit 510, configured to send first information, where the first information includes paging energy-saving configuration information corresponding to each terminal device group in multiple terminal device groups, each terminal device group includes at least one terminal device, and the paging energy-saving configuration information corresponding to the terminal device group is used to configure whether to receive a paging message by at least one terminal device in the terminal device group.

Optionally, in some embodiments, the paging energy-saving configuration information corresponding to the terminal device group includes a piece of paging energy-saving indication information, and the piece of paging energy-saving indication information is used to indicate whether to receive the paging message by the at least one terminal device in the terminal device group.

Optionally, in some embodiments, the paging energy-saving configuration information corresponding to the terminal device group includes at least one piece of paging energy-saving indication information and time information respectively corresponding to the at least one piece of paging energy-saving indication information, the paging energy-saving indication information is used to indicate whether to receive the paging message by the at least one terminal device in the terminal device group, and the time information corresponding to the paging energy-saving indication information indicates a valid time period corresponding to the contents indicated by the paging energy-saving indication information.

Optionally, in some embodiments, the time period indicated by the time information corresponding to the paging energy-saving indication information includes one or more paging frames PFs, or includes one or more paging occasions POs.

Optionally, in some embodiments, the time period indicated by the time information corresponding to the paging energy-saving indication information is a valid time period of the paging energy-saving indication information corresponding to the terminal device group, or is a common valid time period of the paging energy-saving indication information corresponding to the multiple terminal device groups.

Optionally, in some embodiments, the meaning of the time period indicated by the time information corresponding to the paging energy-saving indication information is predefined or is configured by the network device.

Optionally, in some embodiments, the meaning of the time period indicated by the time information corresponding to the paging energy-saving indication information is configured through paging configuration information.

Optionally, in some embodiments, the time information corresponding to the paging energy-saving indication information includes a first bit map, the first bit map includes a plurality of bits, each bit corresponds to a specific time period, and different values of each bit are used to indicate whether to receive the paging message or not in the corresponding time period.

Optionally, in some embodiments, the paging energy-saving configuration information corresponding to the terminal device group includes a plurality of pieces of paging energy-saving indication information, where each piece of paging energy-saving indication information corresponds to a specific time period, and the paging energy-saving indication information is used to indicate whether to receive the paging message by the at least one terminal device in the terminal device group within the time period corresponding to the paging energy-saving indication information.

Optionally, in some embodiments, the time period corresponding to each paging energy-saving indication information is predefined or is configured by the network device.

Optionally, in some embodiments, the time period corresponding to each piece of paging energy-saving indication information is configured through paging configuration information.

Optionally, in some embodiments, the specific time period includes at least one PF and/or at least one PO.

Optionally, in some embodiments, the network device 500 further includes:

a processing unit, configured to determine the terminal device group to which each terminal device belongs according to a preset rule.

Optionally, in some embodiments, the preset rule is used to indicate to determine the terminal device group to which each terminal device belongs according to an identity (ID) of each terminal device.

Optionally, in some embodiments, the multiple terminal device groups belong to one paging group.

Optionally, in some embodiments, the network device 500 further includes:

a processing unit, configured to determine a position of the paging energy-saving configuration information corresponding to each terminal device group in the first information.

Optionally, in some embodiments, the processing unit is specifically configured to:

determine the position of the paging energy-saving configuration information corresponding to each terminal device group in the first information according to the ID of the terminal device in each terminal device group.

Optionally, in some embodiments, the first information is carried in downlink control information DCI.

Optionally, in some embodiments, the DCI includes multiple information blocks, and each information block is used to carry the paging energy-saving configuration information corresponding to one terminal device group.

Optionally, in some embodiments, the DCI is DCI format 2_6 or DCI format 1_0.

Optionally, in some embodiments, the communication unit may be a communication interface or a transceiver, or an input/output interface of a communication chip or a system-on-chip. The processing unit may be one or more processors.

It should be understood that the network device 500 according to the embodiments of the present disclosure can correspond to the network device in the method embodiments of the present disclosure, and the above-mentioned and other operations and/or functions of the units in the network device 500 are used to implement the corresponding process of the network device in the method 200 of FIG. 4, which will not be repeated here for the sake of brevity.

Figure 13:
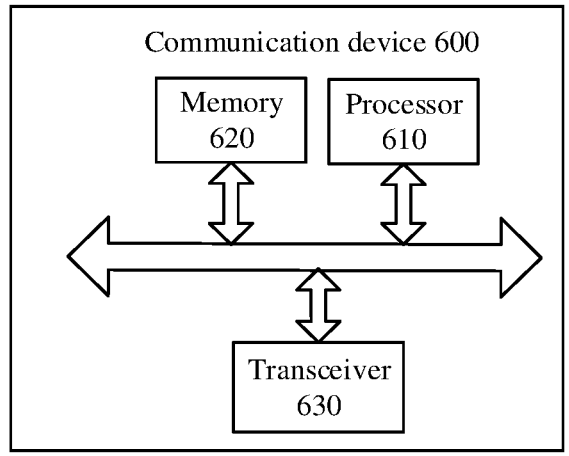
FIG. 13 is a schematic block diagram of a communication device according to another embodiment of the present disclosure.

FIG. 13 is a schematic structural diagram of a communication device 600 according to an embodiment of the present disclosure. The communication device 600 shown in FIG. 13 includes a processor 610. The processor 610 can call and execute a computer program from a memory to implement the methods in the embodiments of the present disclosure.

Optionally, as shown in FIG. 13, the communication device 600 can further include a memory 620. The processor 610 can call and run the computer program from the memory 620 to implement the methods in the embodiments of the present disclosure.

The memory 620 can be a separate device independent of the processor 610, or can be integrated in the processor 610.

Optionally, as shown in FIG. 13, the communication device 600 can further include a transceiver 630, and the processor 610 can control the transceiver 630 to communicate with other devices, and specifically, to transmit information or data to other devices, or to receive information or data transmitted from other devices.

The transceiver 630 can include a transmitter and a receiver. The transceiver 630 can further include an antenna, and the number of the antennas can be one or more.

Optionally, the communication device 600 can specifically be the network device in the embodiments of the present disclosure, and the communication device 600 can carry out the corresponding processes which are implemented by the network device in the methods of the embodiments of the present disclosure, which will not be repeated here for the sake of brevity.

Optionally, the communication device 600 can specifically be a mobile terminal/terminal device in the embodiments of the application, and the communication device 600 can implement the corresponding processes which are implemented by the mobile terminal/terminal device in the methods according to the embodiments of the present disclosure, which will not be repeated here for the sake of brevity.

Figure 14:
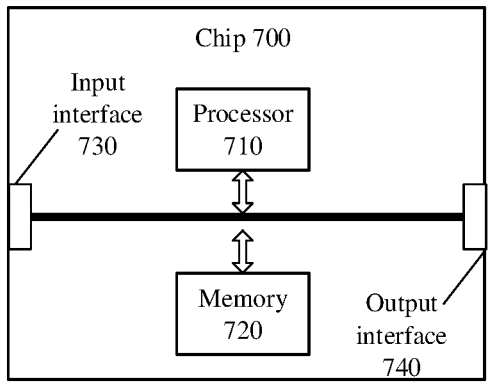
FIG. 14 is a schematic block diagram of a chip according to an embodiment of the present disclosure.

FIG. 14 is a schematic structural diagram of a chip according to an embodiment of the present disclosure. The chip 700 shown in FIG. 14 includes a processor 710 which can call and run a computer program from a memory to implement the methods in the embodiments of the present disclosure.

Optionally, as shown in FIG. 14, the chip 700 can further include a memory 720. The processor 710 can call and run the computer program from the memory 720 to implement the methods in the embodiments of the present disclosure.

The memory 720 can be a separate device independent of the processor 710, or can be integrated in the processor 710.

Optionally, the chip 700 can further include an input interface 730. The processor 710 can control the input interface 730 to communicate with other devices or chips, and specifically, to obtain information or data transmitted by other devices or chips.

Optionally, the chip 700 can further include an output interface 740. The processor 710 can control the output interface 740 to communicate with other devices or chips, and specifically, to output information or data to other devices or chips.

Optionally, the chip can be applied to the network device in the embodiments of the present disclosure, and the chip can carry out the corresponding processes which are implemented by the network device in the methods of the embodiments of the present disclosure, which will not be repeated here for the sake of brevity.

Optionally, the chip can be applied to the mobile terminal/terminal device in the embodiments of the present disclosure, and the chip can implement the corresponding processes which are implemented by the mobile terminal/terminal device in the methods of the embodiments of the present disclosure, which will not be repeated here for the sake of brevity.

It should be understood that the chip mentioned in the embodiments of the present disclosure can also be referred to as a system-level chip, a system chip, a chip system, or a system-on-chip.

Figure 15:
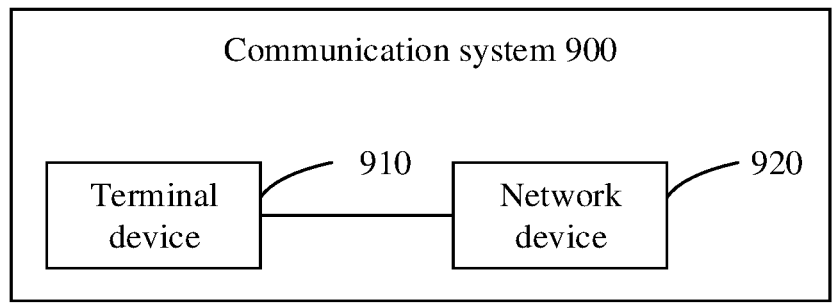
FIG. 15 is a schematic block diagram of a communication system provided by an embodiment of the present disclosure.

FIG. 15 is a schematic block diagram of a communication system 900 according to an embodiment of the present disclosure. As shown in FIG. 15, the communication system 900 includes a terminal device 910 and a network device 920.

The terminal device 910 can be configured to implement the corresponding functions implemented by the terminal device in the above methods, and the network device 920 can be configured to implement the corresponding functions implemented by the network device in the above methods, which will not be repeated here for the sake of brevity.

It should be understood that the processor according to the embodiments of the present disclosure can be an integrated circuit chip with signal processing capability. In the implementations, the steps of the foregoing method embodiments can be completed by an integrated logic circuit of hardware in the processor or by instructions in a form of software. The foregoing processor can be a general-purpose processor, a Digital Signal Processor (DSP), an Application Specific Integrated Circuit (ASIC), a Field Programmable Gate Array (FPGA), other programmable logic devices, discrete gate or transistor logic device, or a discrete hardware component, which can implement the methods, steps, and logical blocks disclosed in the embodiments of the present disclosure. The general-purpose processor can be a microprocessor, any conventional processor or the like. The steps of the methods disclosed in connection with the embodiments of the present disclosure can be directly embodied in and performed by a hardware decoding processor, or can be implemented by a combination of hardware and software modules in the decoding processor. The software modules can be located in a mature storage medium in the art such as a random access memory, a flash memory, a read-only memory, a programmable read-only memory, an electrically erasable programmable memory or a register. The storage medium is located in the memory, and the processor reads information in the memory and implements the steps of the above methods in combination with the hardware thereof.

It can be understood that the memory in the embodiments of the present disclosure may be a volatile memory or a non-volatile memory, or may include both the volatile and non-volatile memories. The non-volatile memory can be a Read-Only Memory (ROM), a Programmable ROM (PROM), an erasable PROM (EPROM), an electrically EPROM (EEPROM) or a flash memory. The volatile memory may be a Random Access Memory (RAM), which is used as an external cache. By way of exemplary but not restrictive description, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM)) and a Direct Rambus RAM (DR RAM). It should be noted that the memories of the systems and methods described herein are intended to include, but are not limited to, these and any other suitable types of memories.

It should be understood that the foregoing description of the memory is exemplary rather than limiting. For example, the memory in the embodiments of the present disclosure can also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch-Link DRAM (SLDRAM), a Direct Rambus RAM (DR RAM), among others. That is to say, the memory in the embodiments of the present disclosure is intended to include but is not limited to those and any other suitable types of memories.

An embodiment of the present disclosure also provides a computer-readable storage medium for storing a computer program.

Optionally, the computer-readable storage medium can be applied to the network device in the embodiments of the present disclosure, and the computer program causes a computer to perform the corresponding processes which are implemented by the network device in the methods of the embodiments of the present disclosure, which will not be repeated here for the sake of brevity.

Optionally, the computer-readable storage medium can be applied to the mobile terminal/terminal device in the embodiments of the present disclosure, and the computer program causes a computer to perform the corresponding processes which are implemented by the mobile terminal/terminal device in the methods of the embodiments of the present disclosure, which will not be repeated here for the sake of brevity.

An embodiment of the present disclosure also provides a computer program product including computer program instructions.

Optionally, the computer program product can be applied to the network device in the embodiments of the present disclosure, and the computer program instructions cause a computer to perform the corresponding processes implemented by the network device in the methods according to the embodiments of the present disclosure, which will not be repeated here for the sake of brevity.

Optionally, the computer program product can be applied to the mobile terminal/terminal device in the embodiments of the present disclosure, and the computer program instructions cause a computer to perform the corresponding processes which are implemented by the mobile terminal/terminal device in the methods of the embodiments of the present disclosure, which will not be repeated here for the sake of brevity.

An embodiment of the present disclosure also provides a computer program.

Optionally, the computer program can be applied to the network device in the embodiments of the present disclosure, and when running on a computer, the computer program causes the computer to perform the corresponding process implemented by the network device in the methods according to the embodiments of the present disclosure, which will not be repeated here for the sake of brevity.

Optionally, the computer program can be applied to the mobile terminal/terminal device in the embodiments of the present disclosure, and when running on a computer, the computer program causes the computer to perform the corresponding processes implemented by the mobile terminal/terminal device in the methods of the embodiments of the present disclosure, which will not be repeated here for the sake of brevity.

Based on the above technical solutions, by dividing the terminal devices into multiple terminal device groups, further configuring corresponding paging energy-saving configuration information for each terminal device group, and controlling the reception of the paging message in units of terminal device groups, it can realize more refined control on the reception of the paging message by the terminal device, thereby improving energy saving effect.

Those of ordinary skill in the art can recognize that the exemplary units and algorithm steps described in connection with the embodiments disclosed herein can be implemented in electronic hardware or a combination of computer software and the electronic hardware. Whether these functions are implemented in hardware or in software depends on the specific applications of the technical solutions and design constraints. Various methods can be used by professional technicians to implement the described functions for each specific application, and such implementations should not be considered as going beyond the scope of the present disclosure.

Those skilled in the art can clearly understand that for convenience and conciseness of the description, for the specific operating process of the systems, devices and units described above, reference can be made to corresponding processes in the foregoing method embodiments, which will not be repeated here.

It should be understood that the systems, devices, and methods disclosed in several embodiments of the present disclosure can be implemented in other manners. For example, the device embodiments described above are merely illustrative. For example, the division of the units is only a logical function division, and in actual implementations, there can be other division manners. For example, a plurality of units or components can be combined or integrated into another system, or some features can be ignored or not implemented. In addition, the coupling or direct coupling or communication connection shown or discussed herein can also be indirect coupling or communication connection through some interfaces, devices or units, and can be in electrical, mechanical or other forms.

The units described as separate components may be or may not be physically separated, and the components shown as units may be or may not be physical units, that is, they may be located in one place or may be distributed over multiple network units. Some or all of the units can be selected to achieve the objectives of the solutions of the embodiments according to actual requirements.

In addition, the functional units in the embodiments of the present disclosure can be integrated into one processing unit, or each of the units can individually exist physically, or two or more of the units can be integrated into one unit.

If implemented in the form of software functional units and sold or used as an independent product, the functions can be stored in a computer-readable storage medium. Based on such understanding, the technical solution of the present disclosure essentially, a part thereof that contributes to the prior art, or a part of the technical solution can be embodied in the form of a software product, and the computer software product is stored in a storage medium and includes instructions which cause a computer device (which may be a personal computer, a server, a network device or the like) to perform all or part of the steps of the methods described in the embodiments of the present disclosure. The foregoing storage medium includes various medium such as a USB drive, a removable hard disk, a ROM, a RAM, a magnetic disk or an optical disc that can store program codes.

Those described above are only specific implementations of the present disclosure, and the protection scope of the present disclosure is not limited thereto. Any alteration or replacement readily devised by a person skilled in the art within the technical scope disclosed in the present disclosure shall fall within the scope of the present disclosure. Therefore, the protection scope of the present disclosure shall be subject to the protection scope of the claims.

What is claimed is:

1. An energy-saving method, comprising:
   receiving, by a terminal device, first information, the first information comprising paging energy-saving configuration information corresponding to each terminal device group in multiple terminal device groups, wherein each terminal device group comprises at least one terminal device, and the paging energy-saving configuration information corresponding to the terminal device group is used to determine whether to receive a paging message by the at least one terminal device in the terminal device group; and
   performing, by the terminal device, reception of the paging message according to the paging energy-saving configuration information corresponding to the terminal device group to which the terminal device belongs,
   wherein the paging energy-saving configuration information corresponding to the terminal device group comprises at least one piece of paging energy-saving indication information and time information respectively corresponding to the at least one piece of paging energy-saving indication information, the paging energy-saving indication information is used to indicate whether to receive the paging message by the at least one terminal device in the terminal device group, and the time information corresponding to the paging energy-saving indication information indicates a valid time period corresponding to contents indicated by the paging valid energy-saving indication information, and
   wherein the valid time period indicated by the time information corresponding to the paging energy-saving indication information is a time period of the paging energy-saving indication information corresponding to the terminal device group, or a common valid time period of the paging energy-saving indication information corresponding to the multiple terminal device groups.

2. The method according to claim 1, wherein the valid time period indicated by the time information corresponding to the paging energy-saving indication information comprises one or more paging frames, PFs, or one or more paging occasions, POs.

3. The method according to claim 1, wherein meaning of the valid time period indicated by the time information corresponding to the paging energy-saving indication information is predefined or is configured by a network device.

4. The method according to claim 1, wherein the time information corresponding to the paging energy-saving indication information comprises a first bit map, the first bit map comprises a plurality of bits, each bit corresponds to a specific time period, and different values of each bit are used to indicate whether to receive the paging message or not in the corresponding time period.

5. The method according to claim 4, wherein the specific time period comprises at least one PF and/or at least one PO.

6. The method according to claim 1, further comprising:
   determining, by the terminal device according to a preset rule, the terminal device group to which the terminal device belongs.

7. The method according to claim 6, wherein the preset rule is used to indicate to determine the terminal device group to which the terminal device belongs according to an identity, ID, of the terminal device.

8. The method according to claim 1, further comprising:
   determining, by the terminal device, a position of the paging energy-saving configuration information corresponding to the terminal device group to which the terminal device belongs in the first information.

9. The method according to claim 8, wherein the determining, by the terminal device, the position of the paging energy-saving configuration information corresponding to the terminal device group to which the terminal device belongs in the first information comprises:
determining the position of the paging energy-saving configuration information corresponding to the terminal device group to which the terminal device belongs in the first information, according to an identity, ID, of the terminal device.

10. The method according to claim 1, wherein the first information is carried in Downlink Control Information, DCI.

11. The method according to claim 10, wherein the DCI comprises a plurality of information blocks, and each information block is used to carry the paging energy-saving configuration information corresponding to one terminal device group.

12. An energy-saving method, comprising:
sending, by a network device, first information, the first information comprising paging energy-saving configuration information corresponding to each terminal device group in multiple terminal device groups, wherein each terminal device group comprises at least one terminal device, and the paging energy-saving configuration information corresponding to the terminal device group is used to configure whether to receive a paging message by the at least one terminal device in the terminal device group,
wherein the paging energy-saving configuration information corresponding to the terminal device group comprises at least one piece of paging energy-saving indication information and time information respectively corresponding to the at least one piece of paging energy-saving indication information, the paging energy-saving indication information is used to indicate whether to receive the paging message by the at least one terminal device in the terminal device group, and the time information corresponding to the paging energy-saving indication information indicates a valid time period corresponding to contents indicated by the paging energy-saving indication information, and
wherein the valid time period indicated by the time information corresponding to the paging energy-saving indication information is a valid time period of the paging energy-saving indication information corresponding to the terminal device group, or a common valid time period of the paging energy-saving indication information corresponding to the multiple terminal device groups.

13. A network device, comprising a processor and a memory for storing a computer program, wherein the processor is configured to call and run the computer program stored in the memory to perform the method according to claim 12.

14. A terminal device, comprising:
a transceiver;
a processor; and
a memory for storing a computer program executable by the processor,
wherein the transceiver is configured to:
receive first information, the first information comprising paging energy-saving configuration information corresponding to each terminal device group in multiple terminal device groups, wherein each terminal device group comprises at least one terminal device, and the paging energy-saving configuration information corresponding to the terminal device group is used to determine whether to receive a paging message by the at least one terminal device in the terminal device group; and
perform reception of the paging message according to the paging energy-saving configuration information corresponding to the terminal device group to which the terminal device belongs,
wherein the paging energy-saving configuration information corresponding to the terminal device group comprises at least one piece of paging energy-saving indication information and time information respectively corresponding to the at least one piece of paging energy-saving indication information, the paging energy-saving indication information is used to indicate whether to receive the paging message by the at least one terminal device in the terminal device group, and the time information corresponding to the paging energy-saving indication information indicates a valid time period corresponding to contents indicated by the paging energy-saving indication information, and
wherein the valid time period indicated by the time information corresponding to the paging energy-saving indication information is a valid time period of the paging energy-saving indication information corresponding to the terminal device group, or a common valid time period of the paging energy-saving indication information corresponding to the multiple terminal device groups.

* * * * *